(12) United States Patent
Measor

(10) Patent No.: US 11,383,429 B2
(45) Date of Patent: Jul. 12, 2022

(54) 3D PRINTED OPTOFLUIDIC DEVICE AND METHODS OF FABRICATION

(71) Applicant: Whitworth University, Spokane, WA (US)

(72) Inventor: Philip S. Measor, Spokane, WA (US)

(73) Assignee: Whitworth University, Spokane, WA (US)

( * ) Notice: Subject to any disclaimer, the term of this patent is extended or adjusted under 35 U.S.C. 154(b) by 346 days.

(21) Appl. No.: 16/777,585

(22) Filed: Jan. 30, 2020

(65) Prior Publication Data
US 2021/0016497 A1 Jan. 21, 2021

Related U.S. Application Data

(60) Provisional application No. 62/874,344, filed on Jul. 15, 2019.

(51) Int. Cl.
| | | |
|---|---|---|
| *B29C 64/135* | (2017.01) | |
| *B29C 64/35* | (2017.01) | |
| *B29C 64/264* | (2017.01) | |
| *B33Y 10/00* | (2015.01) | |
| *B01L 3/00* | (2006.01) | |
| *B33Y 80/00* | (2015.01) | |

(52) U.S. Cl.
CPC ...... *B29C 64/135* (2017.08); *B01L 3/502707* (2013.01); *B29C 64/264* (2017.08); *B29C 64/35* (2017.08); *B33Y 10/00* (2014.12); *B33Y 80/00* (2014.12); *B01L 2200/12* (2013.01); *B01L 2200/16* (2013.01); *B01L 2300/0809* (2013.01); *B01L 2300/12* (2013.01)

(58) Field of Classification Search
CPC ............ B01L 2200/12; B01L 2200/16; B01L 2300/0809; B01L 2300/12; B01L 3/502707; B29C 64/124; B29C 64/135; B29C 64/264; B29C 64/35; B33Y 10/00; B33Y 40/20; B33Y 80/00
See application file for complete search history.

(56) References Cited

U.S. PATENT DOCUMENTS

2009/0243065 A1* 10/2009 Sugino ................. H01L 25/105
257/E23.116
2016/0229690 A1* 8/2016 Nakao ............... H01L 23/49579

OTHER PUBLICATIONS

Stereolithography: Materials, Processes and Applications by Paulo Jorge Bártolo (Editor) Springer (Publisher) ISBN 978-0-387-92903-3 e-ISBN 978-0-387-92904-0 DOI 10.1007/978-0-387-92904-0, Chapter 2, p. 49 (Year: 2014).*
Gross et al. Evaluation of 3D printing and its potential impact on biotechnology and the chemical sciences. Anal Chem. Apr. 1, 2014; 86(7):3240-53. doi: 10.1021/ac403397r. Epub Jan. 3, 20140. PMID: 24432804. (Year: 2014).*

* cited by examiner

*Primary Examiner* — Jennifer Wecker
*Assistant Examiner* — Jonathan Bortoli
(74) *Attorney, Agent, or Firm* — Lee & Hayes, P.C.

(57) ABSTRACT

Methods and systems for optofluidic device fabrication and design are herein disclosed. In examples, a user may manufacture the optofluidic device using stereolithography (SLA) three-dimensional (3D) printing, in which photosensitive resin is exposed to a focused laser, solidifying specific areas of resin. The optofluidic device may guide light for a broad wavelength range from a liquid or gas channel comprised within and may be used to guide the emission of light and particles of interest to a detector to identify the particles.

20 Claims, 11 Drawing Sheets

3D PRINTED OPTOFLUIDIC DEVICE AND METHODS OF FABRICATION

CROSS-REFERENCE TO RELATED APPLICATIONS

This application claims priority to and is a non-provisional application of U.S. Provisional Patent Application No. 62/874,344, filed on Jul. 15, 2019, the entire contents of which are incorporated herein by reference.

BACKGROUND

Optofluidic devices have been used to study minute amounts of fluids. Optofluidic devices, such as lab-on-a-chip devices that perform tests typically completed in a lab miniaturized to a small chip, for example, integrate microfluidics to perform fluid analysis. Described herein are techniques to improve technical problems that can be used, among other things, to enhance fabrication and design techniques of optofluidic devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
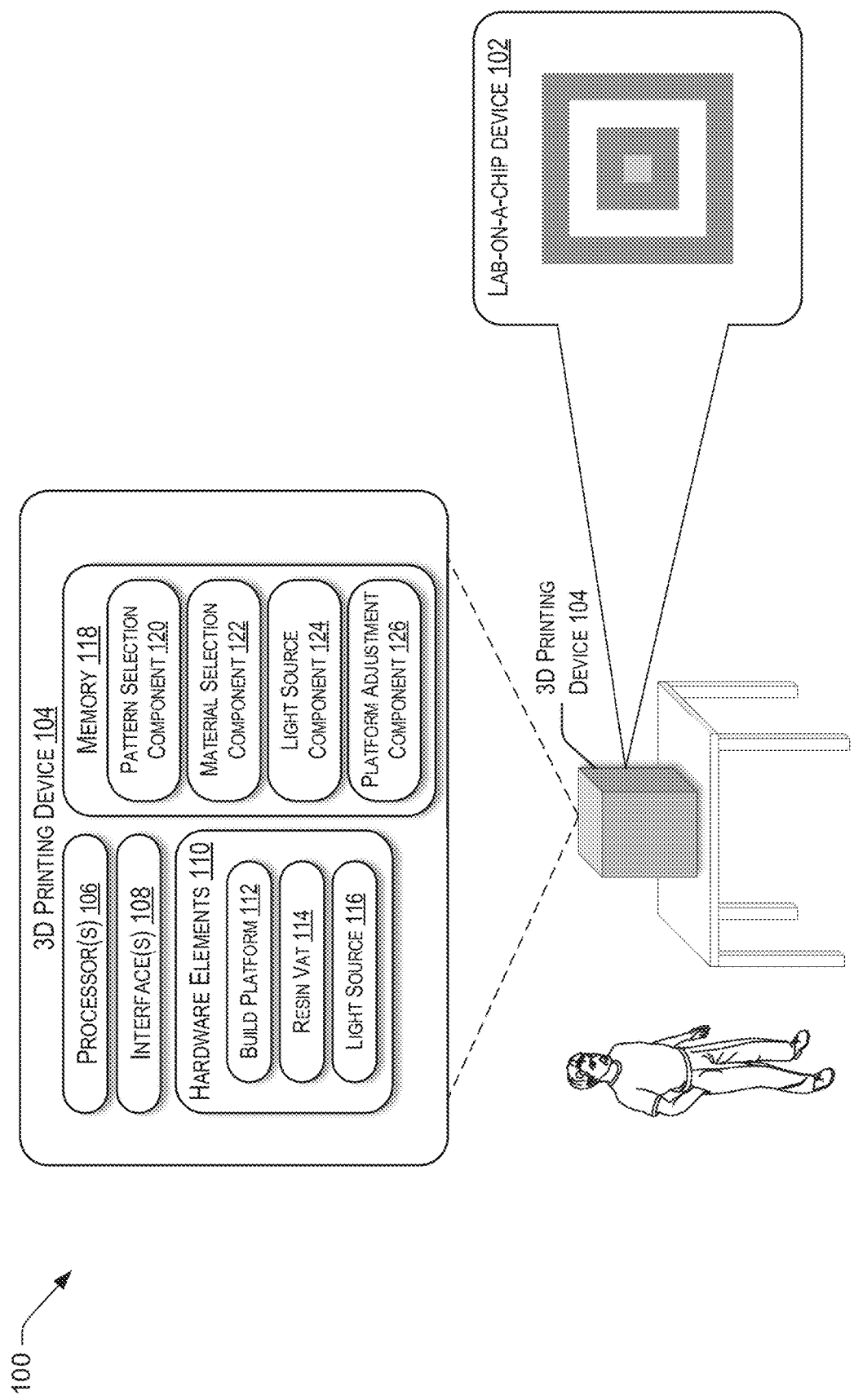
FIG. 1 illustrates a schematic diagram of an example system for manufacturing an optofluidic device.

Recent optofluidic devices, such as lab-on-a-chip devices, have been developed using liquid-core antiresonant-reflecting optical waveguides (ARROWs) on the scale of a single blood cell (about 10 µm) to detect target molecules, such as chemicals, DNA, and RNA. This detection enables ultra-sensitive optofluidic detection down to a single molecule and has increased the potential for applications that eliminate trips to the doctor's office and allow for at-home testing for things such as viral and bacterial infections.

The primary method for fabricating high-sensitivity optofluidic sensors is to use silicon microfabrication techniques similar to those used in the semiconductor industry. While in principle device fabrication costs are inexpensive on a mass scale, the infrastructure required to manufacture such devices may be cost inhibitive. For example, a typical semiconductor facility may cost millions to billions of dollars. A solution, however, may rely on the use of three-dimensional (3D) printing.

3D printing, otherwise described as additive manufacturing, is an alternative technology to microfluidic device fabrication without the severe cost challenges. 3D printing involves creating 3D formations using a computer-aided design (CAD) structure with materials that may be added, joined, and/or solidified. One method of 3D printing is fused deposition modeling (FDM). While FDM is limited by the size of the extrusion nozzle and the accuracy of the thermoplastic or other material placement, FMD has recently allowed for feature size definition to about 1000 µm. However, this resolution may be too large for some applications, thus may be insufficient for optofluidic applications.

Another method of 3D printing is stereolithography (SLA), which uses light interaction with photosensitive resin to 3D print. SLA 3D printers may use lasers, which require point-by-point fabrication with a focused laser beam, or digital light processing (DLP) projectors, which, when coupled to a light source—for example, but not limited to, light emitting diodes (LEDs), UV bulbs, or lasers—can make patterns across the projected image all at once rather than one point at a time using a digital micromirror device (DMD). Thus, SLA using DLP may present a solution for engineering production lines that form maskless fabrication methods for micron-scaled feature sizes.

Another obstacle in optofluidic devices is the ability to guide light within the volume. This may be achieved by microscale lenses, mirrors, and/or waveguides, for example. However, an issue presents itself in the media used in waveguides. Biosensing typically occurs in a media of low refractive index, such as water (which has a refractive index of about 1.33 in the visible wavelength range). However, materials developed via 3D printing and silicon microfabrication typically have significantly larger refractive indexes (e.g. 1.5 for many resins or glass in the visible wavelength range), causing light to leak from the water core and into the surrounding media, reducing the amount of light that may be captured for detection. Current approaches to circumvent this problem rely on silicon microfabrication techniques that require layer-by-layer fabrication to define structures within a volume, making it prohibitive to fabricate complex 3D structures. However, 3D printing may be used to fabricate such structures.

Methods and systems for optofluidic device fabrication and design are described herein. In examples, an example environment, such as a laboratory, may include a 3D printing device capable of manufacturing the optofluidic device. For example, a user may desire to use SLA DLP 3D printing, in which a laser may be focused onto a vat of undeveloped, UV-curable resin. The UV-curable resin may increase in absorption as the wavelength of light is shortened, therefore decreasing the penetration depth of light. The decreased penetration depth may decrease the amount of resin that is polymerized, yielding more controlled and smoother channel heights. The resin may also have an optical absorption characterized for about approximately 300 nm to approximately 1000 nm. The light source may include a DLP projector with a LED light source between approximately 350 nm and approximately 380 nm, but not limited to these wavelengths.

To manufacture the optofluidic device disclosed herein, for example, a build platform may be lowered into the vat of resin. Upon lowering the build platform into the vat, a light source may emit a laser in a specified pattern. In some examples, the pattern may be pre-programmed by the user and/or another device. The laser may project through the vat of resin onto the build platform such that the undeveloped resin that comes into contact with the laser is solidified to form a single layer of developed resin on the build platform. In some examples, the build platform may lower one layer to recoat with new undeveloped resin, and the process may be repeated until the design is complete. The laser may be programed to emit different patterns such that each layer of developed resin consists of a different pattern. In some examples, the patterns may repeat themselves. Once the process is complete, the build platform may be raised from the vat of undeveloped resin, and any remaining undeveloped resin may be removed from the completed 3D optofluidic device.

In examples, the optofluidic device may be manufactured using a series of, but not limited to, patterns to create layers of developed resin. For example, once the build platform may be lowered into a vat of undeveloped resin, the light source may emit a first pattern such that a first layer of resin may be deposited on the build platform, the first layer being developed resin. Additionally, the light source may emit light in a second pattern such that the second layer of resin is deposited on the first layer of resin. The second pattern may include a first and second portion of developed resin and a third portion of undeveloped resin, where the third portion may be deposited between the first and second portion of the second layer. As such, the second layer of resin may begin to form the outer wall of the optofluidic device, wherein the outer wall may consist of developed resin.

Additionally, the light source may emit a third pattern such that a third layer of resin is deposited on the second layer of resin. The third layer of resin may include a first portion, second portion, and third portion that may be developed resin. Further, the third layer may include a fourth portion and fifth portion of resin that may be undeveloped resin. In examples, the fourth portion of the third layer of resin may be deposited between the first portion and second portion of the third layer, and the fifth portion of the third layer may be deposited between the second portion and third portion of the third layer of resin. By doing so, the third layer may make up a portion of the optofluidic device, such that at least a portion of the exterior walls and at least a portion of one or more interior walls. In examples, this may form a portion of an outer resin cladding, wherein the outer resin cladding may be comprised of undeveloped resin and encompassed by developed resin.

Additionally, the light source may emit a fourth pattern such that a fourth layer of resin is deposited on the third layer of resin. The fourth layer of resin may include a first portion, second portion, third portion, and/or fourth portion that may be developed resin. Further, the fourth layer may include fifth portion, sixth portion, and/or seventh portion of resin that may be undeveloped resin. By doing so, the fourth layer may build upon the third layer, elongating the exterior and/or interior walls of the outer cladding and defining at least a portion of an inner resin cladding, wherein the inner resin cladding may be deposited within the outer resin cladding. In examples, the inner resin cladding may be comprised of undeveloped resin and may be encompassed by the developed resin.

Additionally, the light source may emit a light in the third pattern such that a fifth layer of resin may be deposited on the fourth layer of resin. In examples, the fifth portion of the fourth layer of resin may be deposited between the first portion and second portion of the fourth layer, the sixth portion of the fourth layer may be deposited between the second portion and third portion of the fourth layer of resin, and the seventh portion of the fourth layer of resin may be deposited between the third portion and fourth portion of the fourth layer. As a result, a fifth layer may build upon the fourth layer, further elongating the exterior and/or interior walls of the outer cladding and fully forming an inner resin cladding encompassed by developed resin.

Additionally, the light source may emit light in the second pattern such that a sixth layer of resin may be deposited on the fifth layer of resin. By deposing the sixth layer, the exterior and/or interior walls of the outer cladding are further elongated. Additionally, the light source may emit light in the first pattern such that a seventh layer of resin may be deposited on the sixth layer of resin. By doing so, the optofluidic device may be fully formed, wherein an inner resin cladding may be deposited within an outer resin cladding.

To provide support to internal structures, the user and/or another device may program the laser to create temporary support structures between layers and/or between portions of layers, which may be removed later in manufacturing.

In other examples, manufacture of the optofluidic device may include a "bottom up" approach using inverted stereolithography. This process may require the manufacturing process to start by lowering the built platform to touch the bottom of the vat of resin. The laser may emit a first pattern upward through the vat of resin to come into contact with the build platform, thus solidifying and developing undeveloped resin which the laser may come into contact with. In some examples, the vat may be tilted at a pre-defined angle, up to 5 degrees by way of example, and peeled away from the now-hardened developed resin, in which the developed resin may detach from the bottom of the vat while remaining attached to the build platform. New liquid undeveloped resin may flow in the newly created space between the developed resin and bottom of the vat, and the process may be repeated until the optofluidic device is complete.

In examples, the optofluidic device may go through a surface roughness treatment, that may be called microfluidic curing. After manufacturing the optofluidic device using 3D printing, residual non-polymerized undeveloped resin may exist within the channels of the device. To remove the undeveloped resin, the channels may be patterned to connect to a microfluidic connector and eject the remaining undeveloped resin, leaving at least a layer of undeveloped resin. The remaining resin may be exposed with a UVA lamp post-ejection to be polymerized.

In examples, the optofluidic device may consist of a first resin cladding and/or a second resin cladding. The second resin cladding may be deposited within the first resin cladding and may be separated at least in part from the first resin cladding such that a rectangular gap or substantially rectangular gap is present between the first resin cladding and second resin cladding. It should be understood that while the gap is described as rectangular, other geometric configurations are included in this disclosure, such as, for example, polygonal and/or square configurations. Further, in examples, the second resin cladding may be substantially rectangular and may have a partially hollow and rectangular interior portion. In examples, the optofluidic device may have at least one dimension less than 100 µm or as high as the DMD size multiplied by the magnification of the optical imaging system.

In examples, the optical loss of the waveguide may be determined by using a cutback method. The optical loss may be determined by the optical power measurements verses the length of the waveguide by: $P_{out}=P_{in} e^{-\alpha L}$, where the optical power may exponentially decay as the power is lost and the mode propagates through the waveguide via the characteristic loss coefficient, $\alpha$, over the propagation distance, L. The loss coefficient may, in principle, be the superposition of the contributions of all the individual mode losses propagating over the same distance, the scattering loss, and the absorption loss, but may be limited by the scattering loss and absorption loss in the case of the ARC waveguide. Therefore, the loss coefficient may be measured by cutting the waveguide at different lengths and measuring the output power, $P_{out}$, versus the input power, $P_{in}$. In some iterations, cutting the waveguide to different lengths may result in an end facet with high roughness, thus scattering the light propagating out from the waveguide facet and thereby decreasing the measured output power. This may be mitigated by smoothing the waveguide facet using polishing techniques, fabricating waveguides with different lengths (rather than cutting them), and/or using other methods such as scattered light imaging (using the scattered light and imaging the light lost over the distance of the waveguide).

In examples, a lab-on-a-chip device may integrate the optofluidic device and at least one optical component. In one example, the optofluidic device may include an air inlet and/or a fluid inlet. The air inlet may allow for air to be injected into a rectangular air gap located in the optofluidic device. The fluid inlet may allow fluid to be injected into a hollow and rectangular fluid channel. In some examples, the fluid may contain one or more fluorescent particles which may be detected in the optofluidic device. For example, the optofluidic device may be coupled to single-mode fibers (SMFs) and multi-mode fibers (MMFs). In some examples, an excitation light may be emitted from the SMFs. The excitation light may project through the optofluidic device, including the fluid located within the device. In some examples, the excitation light may come into contact with one or more fluorescent particles, exciting one or more of the particles. The excited particles may travel through the optofluidic device to an output coupler. In some examples, once the excited particles reach the output coupler, the excited particles may be captured by a detector. In some examples, the detector may be located in the MMFs. The detector may detect and identify the excited particles, and in some examples may be capable of single particle detection.

In some examples, due to laminar flow, undeveloped resin flow may be hidden behind optical coupling points. To reduce the effect of the hidden resin, air and/or another gas may be pushed through the air channel, ejecting at least some of the undeveloped resin. The remaining undeveloped resin may be tuned by adjusting the dimension of the optical coupling, allowing at least some selection of how much undeveloped resin remains in the air channel for post-process smoothing.

In examples, fluorescently-labeled latex beads may be introduced into the fluid inlet. The latex beads may include fluorescent dye. When the fluorescently-labeled latex beads cross the SMF intersection, the fluorescent dye may be excited, and the emission may be captured within the optofluidic device. In some examples, latex particles may stick to the walls of the fluid channel and may clog the channel. To remove the latex particles, a detergent may be introduced to the fluid. In other examples, the channel may be coated with a thin layer of a non-reactive surface (such as PEG) to remove the latex particles. To increase particle detection, various resins with a low autofluorescence may be used. In some examples, resin with a low autofluorescence may reduce the excitation of the latex particles such that the particle fluorescence occurs at a different timescale compared to autofluorescence. Alternatively, a spatially-modulated excitation pattern may be used. For example, particles may fluoresce with a specific temporal pattern while the autofluorescence remains constant.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated and/or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for manufacturing an optofluidic device 102. The system 100 may include, for example, a 3D printing device 104. As used herein, the term "environment" means a given area. Non-limiting examples of environments may be, for example, a room, a laboratory, an office, and/or a place of business.

The 3D printing device 104 may include components such as, for example, one or more processor(s) 106, one or more network interface(s) 108, hardware elements 110, and/or memory 118. It should be understood that while several examples used herein include a programmable 3D printing device 104 that allows users to interact therewith via programmed commands, one or more other devices, which may not include programmed commands, may be utilized instead of or in addition to the 3D printing device 104. In these examples, the 3D printing device 104 may be programmed to allow users to manufacture an optofluidic device. However, the 3D printing device 104 may be configured to send and receive data over a remote network. The hardware elements 110 located within the 3D printing device 104 may include one or more components such as, for example, a build platform 112, resin vat 114, and/or a light source 116. The memory 118 may include one or more components such as, for example, a pattern selection component 120, material selection component 120, light source component 124, and/or platform adjustment component 126. The hardware elements 110 and memory 118 will be described in more detail below. As used herein, a processor, such as processor(s) 106 and/or the processor(s) described with respect to the components of the 3D printing device 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 106 and/or the processor(s) described with respect to the components of the 3D printing device 104 may include a graphics processing unit (GPU), a microprocessor, a digital signal processor, or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 106 and/or the processor(s) described with respect to the components of the 3D printing device 104 may possess its own local memory, which also may store program components, program data, and/or one or more operating systems.

The memory 118 and/or the memory described with respect to the components of the 3D printing device 104 may include volatile and nonvolatile memory, removable and non-removable media implemented in any method or technology for storage of information, such as computer-readable instructions, data structures, program component, or other data. Such memory 118 and/or the memory described with respect to the components of the 3D printing device 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or the memory described with respect to the components of the 3D printing device 104 may be implemented as computer-readable storage media ("CRSM"), which may be any available physical media accessible by the processor(s) 110 and/or the processor(s) described with respect to the 3D printing device 104 to execute instructions stored on the memory 118 and/or the memory described with respect to the components of the 3D printing device 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118 and/or the memory described with respect to the components of the 3D printing device 104, discussed herein may include at least one operating system (OS) component that is configured to manage hardware resource devices such as the network interface(s), the I/O devices of the respective apparatuses, and so forth, and provide various services to applications or components executing on the processors.

The interface(s) 108 and/or the interface(s) described with respect to the components of the 3D printing device 104 may enable directives between the components and/or devices shown in system 100 and/or with one or more other systems, as well as other networked devices. Such interface(s) 108 and/or the network interface(s) described with respect to the components of the 3D printing device 104 may include one or more network interface controllers (NICs) or other types of transceiver devices to send and receive directives over a network.

For instance, each of the interface(s) 108 and/or the network interface(s) described with respect to the components of the 3D printing device 104 may include a personal area network (PAN) component to enable directives over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the interface(s) 108 and/or the network interface(s) described with respect to the components of the 3D printing device 104 may include a wide area network (WAN) component to enable message over a wide area network.

In some instances, a remote system may be local to an environment associated the 3D printing device 104. For instance, the remote system may be located within one or more of the 3D printing devices 104. While various components of the 3D printing device 104 have been labeled and named in this disclosure and each component has been described as being configured to cause the processor(s) to perform certain operations, it should be understood that the described operations may be performed by some or all of the components and/or other components not specifically illustrated.

FIG. 1 illustrates a schematic diagram of an example system for manufacturing an optofluidic device. The system may include, for example, 3D printing device 104. The 3D printing device may be configured to receive directives corresponding to manufacturing optofluidic devices, for example. The 3D printing device 104, for example, may be pre-configured to manufacture an optofluidic device prior to the time of manufacturing. In other examples, the 3D printing device 104 may be programmed to alter one or more aspects of the optofluidic device at the time of manufacturing. The 3D printing device 104 may be situated in a laboratory, in a healthcare facility, or in an office, for example. The 3D printing device 104 may include one or more components, such as one or more processors 106, one or more interfaces 108, hardware elements 110, and/or memory 118. The hardware element(s) 110 may include one or more elements such as a build platform element 112, a resin vat element 114 and/or a light source element 116. The memory 118 may include one or more elements such as a pattern selection component 120, a material selection component 122, a light source component 124, and/or a platform adjustment component 126. The components of the 3D printing device 104 are described below in detail. In examples, some or each of the components of the 3D printing device 104 may include their own processor(s), interface(s), and/or memory. As such, by way of example, the 3D printing device 104 may include and/or be associated with processor(s), interface(s), and/or memory. Additionally, the operations and/or functionalities associated with and/or described with respect to the components of the 3D printing device 104 may be performed utilizing cloud-based computing resources.

The components of the 3D printing device 104 as outlined above will now be described with reference to several examples. It should be understood that the examples provided herein are for illustration and should not be construed as a limitation of this disclosure. In examples, a user may travel to an environment, such as a laboratory, to use operate the 3D printing device 104. In examples, the 3D device may include, but not limited to, hardware elements 110 such as a build platform 112, resin vat 114, and/or light source 116.

To manufacture an optofluidic device, for example, the build platform 112 may be lowered into the resin vat 114. For example, the build platform 112 may have a flat surface in which an adhesive, such as a resin, may be applied. The build platform 112 may be comprised of, for example, glass, polypropylene, and/or steel. The platform adjustment component 126 may be configured to raise and lower the build platform 112 into the resin vat 114 at specified directions, times, and/or speeds. The resin vat 114 may contain one or more types of resin, however any material may be used. In examples, the type of material used may be specified by the material selection component 122. For example, various resins may be used at different stages in the manufacturing process.

Upon lowering the build platform 112 into the resin vat 114, the light source 116 may emit one or more lights in a specific pattern. The pattern may be determined by the pattern selection component 120. In some examples, the pattern may be pre-programmed by the user and/or another device. The light source 116 may project through the resin vat 114 towards the build platform 112. The light source 116 may contain more than one light source, and may include one or more lasers and/or projectors, for example. The light source 116 may be controlled by the light source component 124. The light source component 124 may be configured to, for example, turn the light source 116 off/on, adjust the wavelength of the light source 116, and/or adjust the timing of the light source 116. The material selection component 112 may be configured to allow the user to specify the material to be used in the resin vat 114. Although the resin vat 114 is described in relation to the use of resin, other material(s) may be used. In examples, the resin in the resin vat 114 that comes into contact with the light source 116 may solidify to form a layer of developed resin on the build platform 112. Additionally, the build platform 112 may lower further in the resin vat 114 to recoat with new resin. This process may repeat until the design is complete.

In other examples, manufacture of the optofluidic device may include a "bottom up" approach using inverted stereolithography. This process may require the manufacturing process to start by lowering the built platform 112 to touch the bottom of the resin vat 114. The light source 116 may emit a first pattern upward through the resin vat 114 to come into contact with the build platform 112, thus solidifying and developing resin which the light source 116 may come into contact with. In some examples, the resin vat 114 may be peeled away from the now-hardened developed resin, in which the developed resin may detach from the bottom of the resin vat 114 while remaining attached to the build platform. New liquid undeveloped resin may flow in the newly created space between the developed resin and bottom of the resin vat 114, and the process may be repeated until the optofluidic device is complete.

Figure 2:
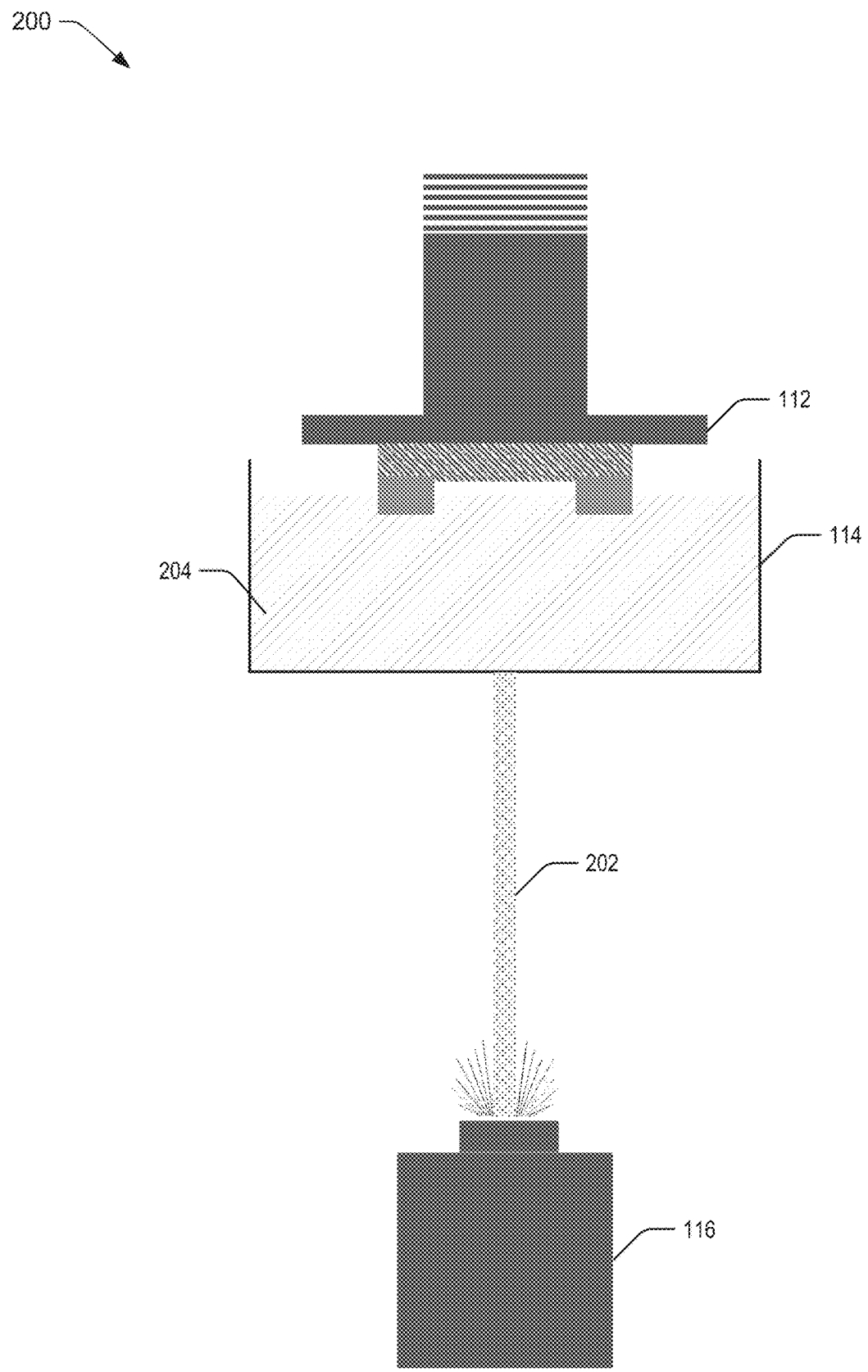
FIG. 2 illustrates a schematic diagram of another example system for manufacturing an optofluidic device using three-dimensional (3D) printing.

FIG. 2 illustrates a schematic diagram of another example system 200 for manufacturing an optofluidic device using 3D printing. In some examples, the build platform 112 may be lowered into the resin vat 114. Upon lowering the build platform 112 into the resin vat 114, the light source 116 may emit at least one or more laser(s) 202 in a pattern. In examples, the pattern may be pre-programed as defined by the user. The laser(s) 202 may project upward, through the resin vat 114 and onto the build platform 112 such that the undeveloped resin 204 which comes into contact with the laser(s) 202 is solidified to form a single layer of developed resin 102 on the build platform 112. In some examples, the build platform 112 may lower at least one layer to recoat with new undeveloped resin 204, and the process may be repeated until the design is complete. The laser(s) 202 may be programed to emit different patterns such that each layer of developed resin 102 consists of a different pattern. In some examples, the patterns may repeat themselves. Once the process is complete, the build platform 112 may be raised from the resin vat 114, and any remaining undeveloped resin may be removed from the completed 3D optofluidic device.

In examples, the undeveloped resin 204 may be UV-curable and/or photosensitive. The undeveloped resin 204 may increase in absorption as the wavelength of light is shortened, therefore decreasing the penetration depth of light. The decreased penetration depth may decrease the amount of resin that is polymerized, yielding a more controlled and smoother z-axis. The undeveloped resin 204 may also have an optical absorption characterized for about approximately 300 nm to approximately 1000 nm. The light source 116 may include a DLP projector with a LED light source between approximately 350 nm and approximately 380 nm, but not limited to these wavelengths.

Figure 3:
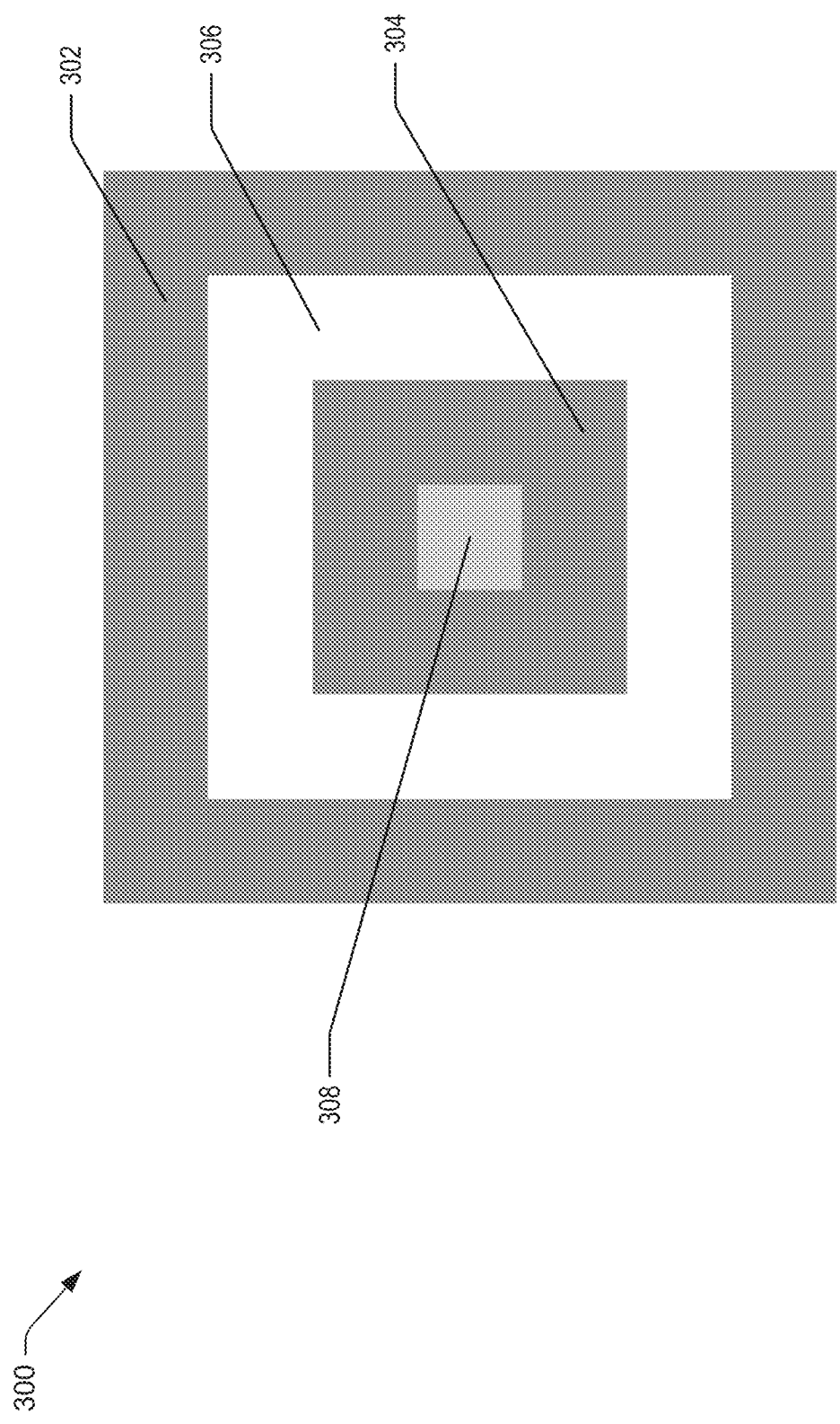
FIG. 3 illustrates a schematic diagram of an optofluidic device.

FIG. 3 illustrates a schematic diagram 300 of a standard optofluidic device. In examples, the optofluidic device may consist of a first resin cladding 302 and a second resin cladding 304. The second resin cladding 304 may be deposited within the first resin cladding 302 and may be separated at least in part from the first resin cladding 302 such that a rectangular a gap 306 is present between the first resin cladding 302 and second resin cladding 304. Further, in examples, the second resin cladding 304 may be substantially rectangular and may have a partially hollow and rectangular interior portion 308. The partially hollow and rectangular interior portion 308 of the second resin cladding 304 may be filled with liquid, such as water. In examples, light may be confined within the first resin cladding 302 and/or second resin cladding 304 using total internal reflection (TIR).

In some examples, the magnitude of the electric field may be depicted in a log plot where the amplitude is normalized by the idealized input Gaussian beam amplitude. The physical mechanism of optical confinement, TIR, is the basis for fiber optics and standard integrated optics. TIR may be achieved when the light ray's angle of incidence, which is measured from the normal of the surface, is greater than a critical angle: $\sin \theta_c = n_2/n_1$, where $n_1$ is the refractive index of the resin and $n_2$ is the refractive index of the air cladding and/or surrounding media. If the angle of incidence $\theta_i = \theta_c$, then the angle of propagation is tangent to the boundary at the interface. If the angle of incidence $\theta_i > \theta_c$, then the angle of reflection $\theta_r = \theta_i$ and all light may be totally reflected internal to the structure. This principle may also be demonstrated in terms of waveguide theory.

Waveguide theory takes advantage of the discretization of solutions to the wave equation, which satisfies Maxwell's equations. The discrete solutions that may exist in specific structures are termed as modes of the optofluidic device. In order to demonstrate that the optofluidic device waveguide may support modes, an optical simulation of the above structure may be completed using an eigenmode solver and transverse electric (TE) modes.

Figure 4:
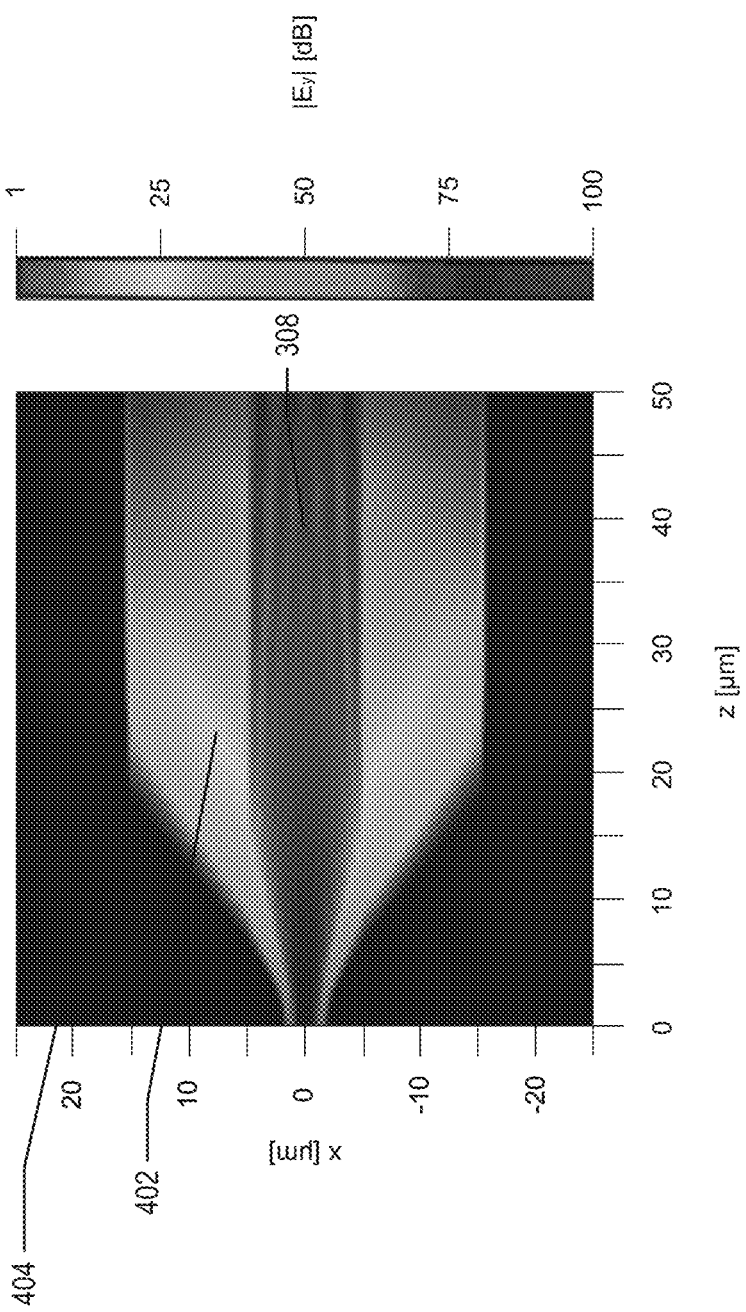
FIG. 4 illustrates a finite-difference time-domain (FDTD) simulation of a 3D printed optofluidic device (ARC waveguide) with a water filled rectangular interior portion.

FIG. 4 illustrates a finite-difference time-domain (FDTD) simulation of a 3D printed optofluidic device with a water filled rectangular interior portion 308, a width of 10 μm, and a light with a wavelength of 635 nm. When light is introduced to the optofluidic device, the light may be confined to the water filled rectangular interior portion 308. In examples, if the propagation distance is large enough, light may sufficiently leak out into the resin cladding 402. However, the light may be confined to the water filled rectangular interior portion 308 and/or the resin cladding 402, rather than leaking into the air cladding 404.

Figure 5:
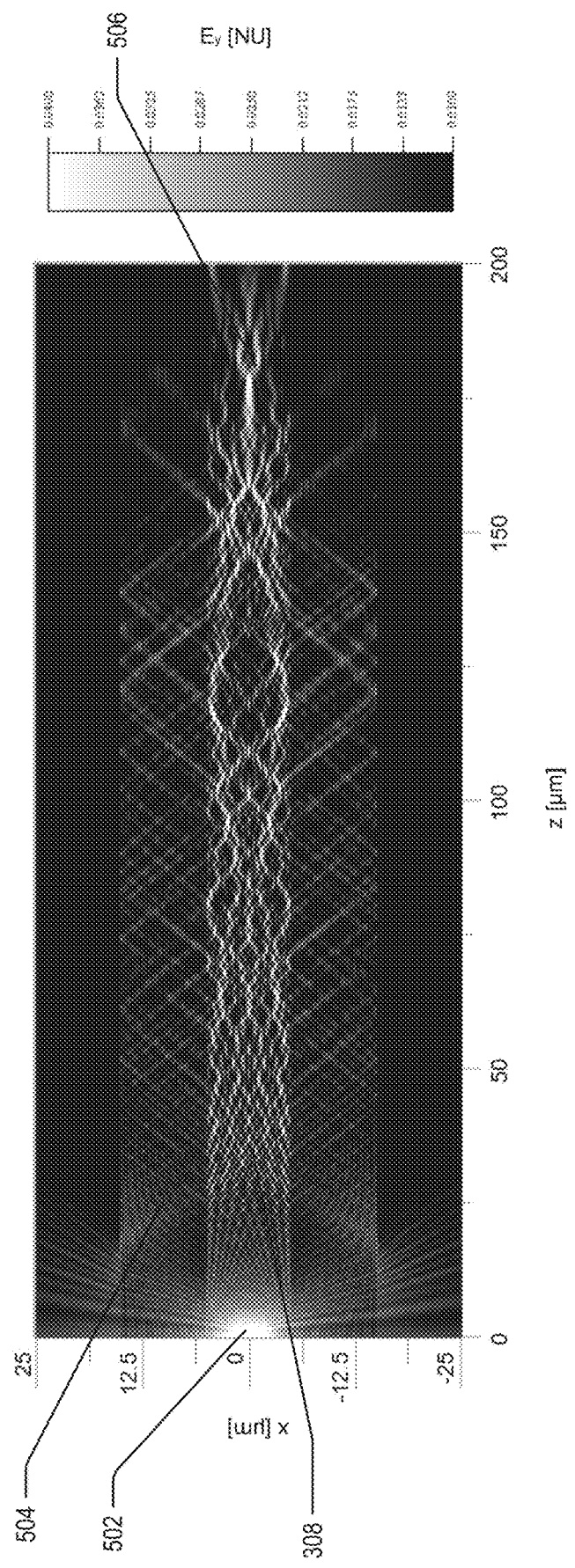
FIG. 5 illustrates an optofluidic device (ARC waveguide) with a 635 nanometer (nm) light point-source emitting light within the device.

FIG. 5 illustrates an optofluidic device with a 635 nm light point-source 502 emitting light into the device. The light rays from the point source 502 may stimulate a fluorescent particle and/or molecule located in the partially hollow and rectangular interior portion 308. The light rays with an angle less than the critical angle 504 may escape partially hollow and rectangular interior portion 308, while the light rays with an angle greater than the critical angle 506 may be captured and propagate a distance of at least 200 μm. The simulation preformed in FIG. 5 indicates a 30% light capture efficiency for the +z direction. However, the light capture efficiency may also be collected in the −z direction for at least a 60% capture. The simulation as depicted in FIG. 5 may also be completed using OmniFDTD electromagnetic simulation software using the FDTD method. For example, this phenomenon may be thought of as waves which may be coupled into the modes of the partially hollow and rectangular interior portion 308. FIG. 5 further illustrates that the emitted light may be coupled into many modes of the optofluidic device. The resulting pattern may result in a superposition of the modes with higher coupling likely in the higher order modes, such as TE and transverse magnetic (TM) modes.

Figure 6:
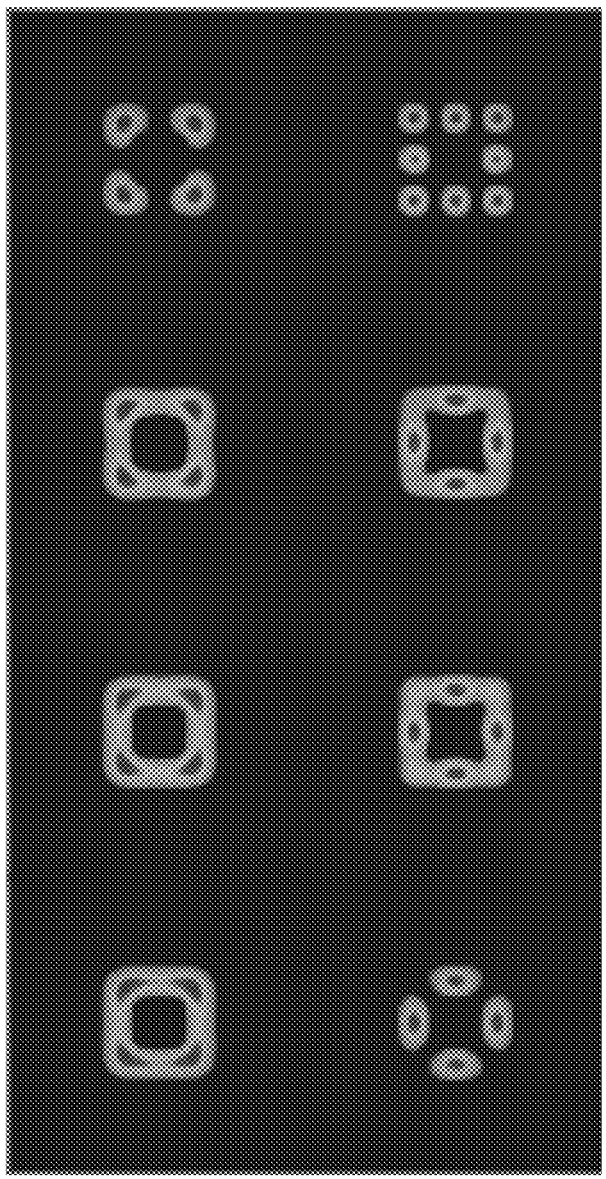
FIG. 6 illustrates the first eight modes of optofluidic device using an eigenmode solver for a wavelength of 635 nm.

FIG. 6 illustrates the first eight even modes of an optofluidic device using an eigenmode solver for a wavelength of 635 nm. This demonstrates that the modes exist and are confined to the partially hollow and rectangular interior portion 308 rather than radiation modes in the air cladding. There may exist TM modes given by the odd number modes of the optofluidic device, which may have similar structures.

Figure 7A:
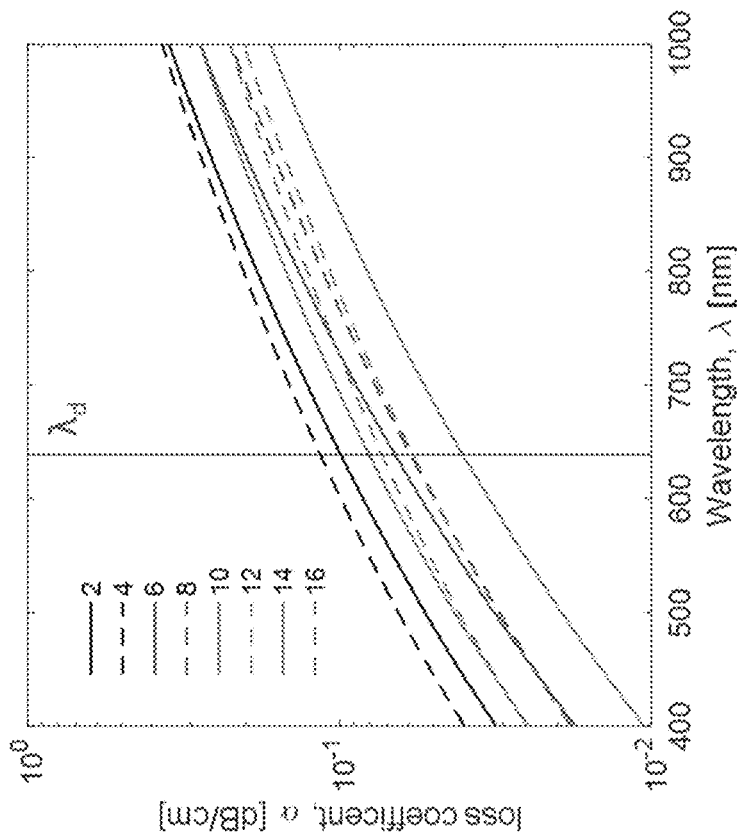
FIG. 7A illustrates an example wavelength dependence for an optofluidic device depicting the design wavelength as a function of the effecting index.
Figure 7B:
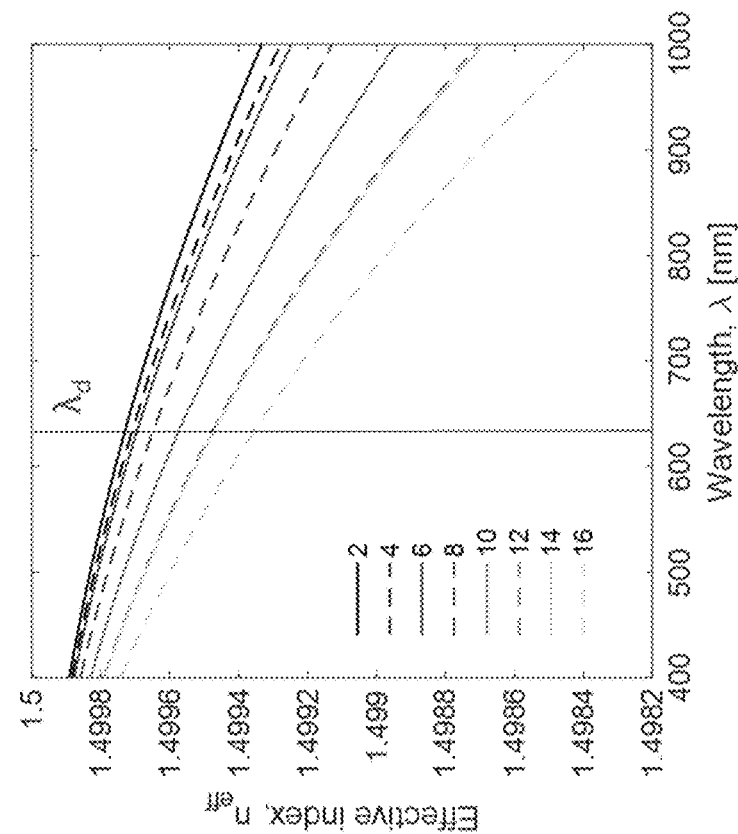
FIG. 7B illustrates an example wavelength dependence for an optofluidic device depicting the design wavelength as a function of the loss coefficient.

FIG. 7A illustrates an example wavelength dependence for an optofluidic device depicting the design wavelength as a function of the effecting index for the first eight TE modes. FIG. 7B illustrates the wavelength dependence for the optofluidic device depicting the design wavelength of 635 nm as a function of the loss coefficient, α, for the first eight TE modes. As illustrated in both FIG. 7A and FIG. 7B, the effective index is close to the resin index $n_{eff}$~1.5 with a low loss predicted of α~0.001 dB/cm for the design wavelength $λ_d$=635 nm. This may be equivalent to 0.023% power loss within a propagation distance of 1 cm. In some examples, this may indicate that the modes exist, optical losses are limited by the absorption in the visible-NIR range, and scattering losses will dominate at a level of α~0.5 dB/cm assuming a surface roughness in the ~10 nm range. In some examples, the odd modes are TM modes with similar losses as TE modes.

In examples, the optical loss may be determined by using a cutback method. The optical loss may be determined by the optical power measurements verses the length of the optofluidic device by: $P_{out}=P_{in} e^{-αL}$, where the optical power may exponentially decay as the power is lost and the mode propagates through the optofluidic device via the characteristic loss coefficient, α, over the propagation distance, L. The loss coefficient may, in principle, be the superposition of the contributions of all the individual mode losses propagating over the same distance, the scattering loss and the absorption loss, but in this case may be limited by the scattering loss and absorption loss. Therefore, the loss coefficient may be measured by cutting the optofluidic device at different lengths and measuring the output power, $P_{out}$, versus the input power, $P_{in}$. In some iterations, cutting the optofluidic device to different lengths may result in an end facet with high roughness, thus scattering the light propagating out from the waveguide and thereby decreasing the measure output power. This may be mitigated by smoothing the waveguide facet using polishing techniques, fabricating optofluidic devices with different lengths (rather than cutting them) and/or using other methods such as scattered light imaging (using the scattered light and imaging the light lost over the distance of the optofluidic device).

Figure 8:
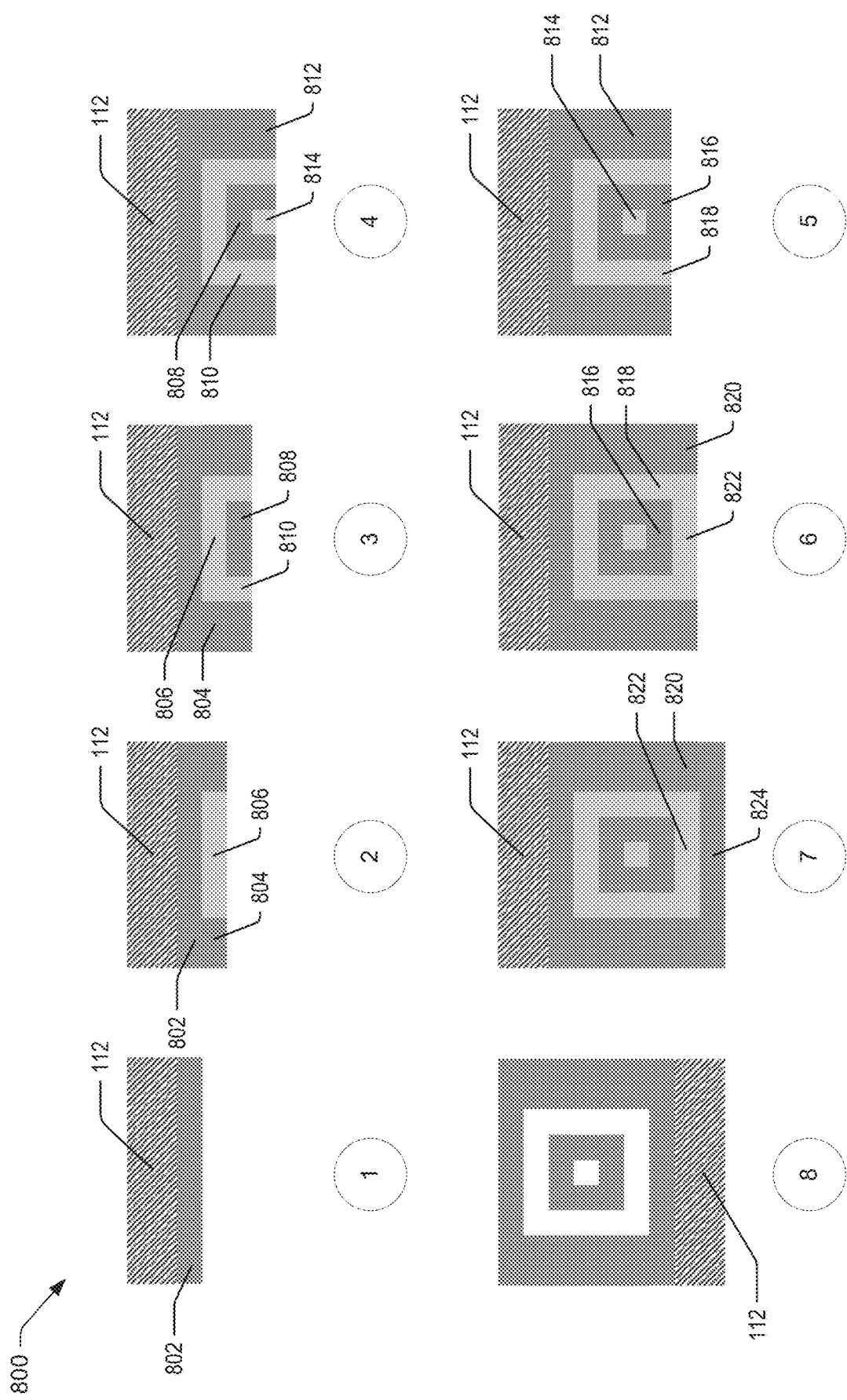
FIG. 8 illustrates schematic diagram of a method of optofluidic device manufacturing.
Figure 9A:
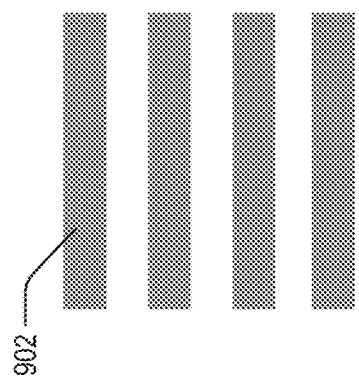
FIG. 9A-D illustrate an example method for surface roughness characterization, which may be referred to as microfluidic curing.
Figure 9B:
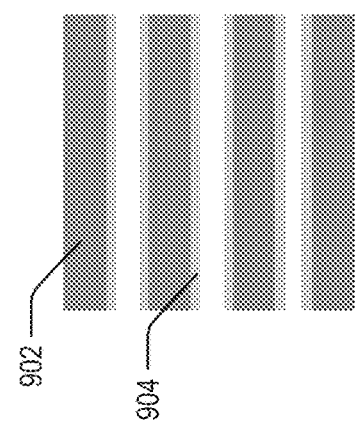
Figure 9C:
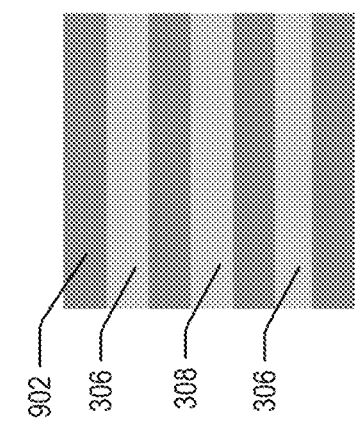
Figure 9D:
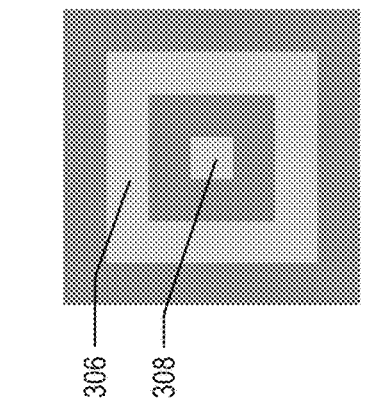
Figure 10:
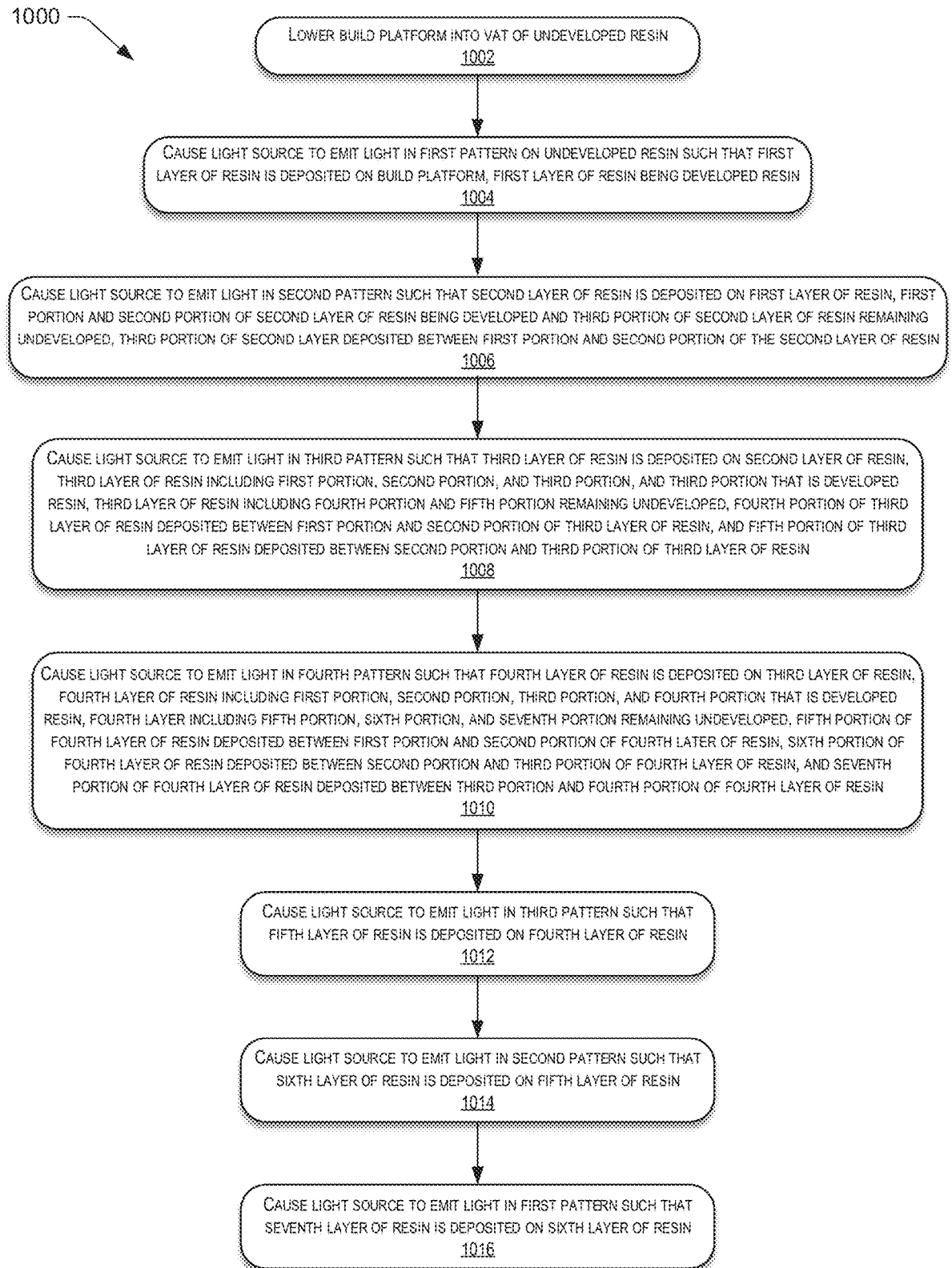
FIG. 10 illustrates a flow diagram of an example process for optofluidic device manufacturing.

FIGS. 8-10 illustrate processes for optofluidic device manufacturing. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 11A-11C, although the processes may be implemented in a wide variety of other environments, architectures and systems.

FIG. 8 illustrates a schematic diagram 800 of a method of optofluidic device manufacturing. The components may include the same or similar components are described above with respect to FIG. 1-7, such as the build platform 112. It should be understood that while the operations described with respect to FIG. 8 are described in a stepwise process from steps 1 to 8, the processes may be performed in a different order and/or in parallel and may include more or less than 8 steps. In examples, the optofluidic device may be manufactured using a series of patterns to create layers of developed resin. For example, the optofluidic device may be manufactured using SLA 3D printing using, but not limited to, a DLP projector to emit light in a user specified pattern.

At step 1, a build platform 112 may be lowered into a vat of, but not limited to, undeveloped, UV-curable resin. In some examples, a light source may emit one or more lasers at specified wavelength(s) in a first pattern of light directed toward the build platform 112. Upon contact with the undeveloped resin, the undeveloped resin may polymerize to form a first layer of developed resin 802 deposited upon the build platform 112. In examples, the pattern of light may be pre-programmed and determined by a user and/or other machine.

At step 2, the light source may emit a light in a second pattern directed toward the build platform 112 and first layer of developed resin 802 such that a second layer of resin may be deposited on the first layer of developed resin 802. In some examples, the second pattern may emit light so that specified portions of the undeveloped resin come in contact with the laser, polymerizing the undeveloped resin to create developed resin, while other portions of the undeveloped resin remain undeveloped. For example, the light source may emit light in a second pattern such that the second layer of resin may include portions of developed resin 804 while a second portion may remain undeveloped resin 806, the second layer of undeveloped resin 804 deposited between the portions of the second layer of developed resin 806.

At step 3, the light source may emit light in a third pattern such that a third layer of resin is deposited on the second layer of resin, including the second layer of developed resin 804 and second layer of undeveloped resin 806. Similar to step 2, the third pattern may include portions of developed resin 808 and portions of undeveloped resin 810, the portions of the third layer of undeveloped resin 810 deposited between the third layer of developed resin 808.

At step 4, the light source may emit light in a fourth pattern such that a fourth layer of resin is deposited on the third layer of resin, including the third layer of developed resin 808 and third layer of undeveloped resin 810. Similar to step 2 and 3, the fourth pattern may include portions of developed resin 812 and portions of undeveloped resin 814, the portions of the fourth layer of undeveloped resin 814 deposited between the portions of the fourth layer of developed resin 812.

At step 5, the light source may emit light in the third pattern, similar to that in step 3, such that a fifth layer of resin is deposited on the fourth layer of resin, including the fourth layer of developed resin 812 and fourth layer of undeveloped resin 814. Similar to steps 2, 3, and 4, the fifth pattern may include portions of developed resin 816 and undeveloped resin 818, the portions of the fifth layer of undeveloped resin 818 deposited between the portions of the fifth layer of developed resin 816.

At step 6, the light source may emit light in the second pattern, similar to that in step 2, such that a sixth layer of resin is deposited on the fifth layer of resin, including the fifth layer of developed resin 816 and fifth layer of undeveloped resin 818. Similar to steps 2, 3, 4, and 5, the sixth pattern may include portions of developed resin 820 and undeveloped resin 822, the portion of the sixth layer of undeveloped resin 822 deposited between the portions of the sixth layer of developed resin 820.

At step 7, the light source may emit light in the first pattern, similar to step 1, such that a seventh layer of resin is deposited on the sixth layer of resin, including the sixth layer of developed resin 820 and sixth layer of undeveloped resin 822. Similar to step 1, the seventh layer may include a portion of developed resin 824.

At step 8, the optofluidic device may be inverted, and the undeveloped resin may be ejected, as described below in FIG. 9.

FIG. 9A-D illustrate an example method for surface roughness mitigation, which may be referred to as microfluidic curing. After the optofluidic device is manufactured, there may exist residual non-polymerized undeveloped resin. FIG. 9A illustrates a standard optofluidic device after the device has been removed from a 3D printing device. In some examples, undeveloped resin may remain in the hollow and rectangular portion 902 and/or the rectangular air gap 904. The hollow rectangular portion 902 and/or the rectangular air gap 904 may be encompassed by developed resin 906.

FIG. 9B-D depict a side view in the y-z axis view of the optofluidic device in FIG. 9A. As shown in FIG. 9B, the hollow rectangular portion 308 and the rectangular air gap 306 may be separated by layers of developed resin 902. To remove at least some of the undeveloped resin from the hollow rectangular portion 308 and/or the rectangular air gap 306, the optofluidic device may be patterned to connect to a micro-fluidic connector which may eject at least a portion of the undeveloped resin in the hollow rectangular portion 308 and/or the rectangular air gap 306. FIG. 9C illustrates an example optofluidic device after at least a portion of the undeveloped resin has been ejected. In some examples, at least a portion of undeveloped resin 904 may remain in the optofluidic device. To remove the remaining undeveloped resin 904, the optofluidic device may, for example, be exposed to a UVA lamp (other wavelengths of light could also be used). The UVA lamp may polymerize the remaining undeveloped resin 904 to developed resin 902. FIG. 9D depicts the final optofluidic device after at least a portion of the remaining undeveloped resin 904 has been polymerized, leaving only developed resin 902.

FIG. 10 illustrates a flow diagram of an example process 1000 for optofluidic device manufacturing. The order in which the operations or steps are described is not intended to be construed as a limitation, and any number of the described operations may be combined in any order and/or in parallel to implement process 1000.

For example, at block 1002, the process 1000 may include lowering the build platform into the vat of undeveloped resin. The build platform may have a flat surface which an adhesive, such as a resin, may be applied. The build platform may be comprised of, for example, glass, polypropylene, and/or steel. In examples, the user and/or other machine may, using the platform adjustment component, control elements of the movement of the built platform, such as the direction, speed, and/or timing. As described above, the resin may be UV-curable resin which may polymerize upon contact with a light source, becoming developed resin. In examples, the resin may have an optical absorption characterized for about approximately 300 nm to approximately 1000 nm.

At block 1004, a light source may emit a first pattern such that a first layer of resin may be deposited on the build platform, the first layer being developed resin. The light source may include, for example, a laser and/or projector, which may be directed upward through the vat of resin to the build platform.

At block 1006, the light source may emit light in a second pattern such that the second layer of resin is deposited on the first layer of resin. The second pattern may include a first and second portion of developed resin and a third portion of undeveloped resin, where the third portion may be deposited between the first and second portion of the second layer. In some examples, the pattern may be pre-programmed by the user and/or another device via the pattern selection component. In other examples, the user and/or other device may determine a pattern to be projected during manufacturing.

At block 1008, the light source may emit a third pattern such that a third layer of resin is deposited on the second layer of resin. The third layer of resin may include a first portion, second portion, and third portion that may be developed resin. Further, the third layer may include a fourth portion and fifth portion of resin that may be undeveloped resin. In examples, the fourth portion of the third layer of resin may be deposited between the first portion and second portion of the third layer, and the fifth portion of the third layer may be deposited between the second portion and third portion of the third layer of resin. As a result, the third layer may begin to make up a portion of the optofluidic device, such as part of the exterior walls and part of one or more interior walls.

At block 1010, the light source may emit a fourth pattern such that a fourth layer of resin is deposited on the third layer of resin. The fourth layer of resin may include a first portion, second portion, third portion, and/or fourth portion that may be developed resin. Further, the fourth layer may include fifth portion, sixth portion, and/or seventh portion of resin that may be undeveloped resin. In examples, the fifth portion of the fourth layer of resin may be deposited between the first portion and second portion of the fourth layer, and the sixth portion of the fourth layer may be deposited between the second portion and third portion of the fourth layer of resin and the seventh portion of the fourth layer of resin may be deposited between the third portion and fourth portion of the fourth layer. By doing so, the fourth layer may continue to build upon the first, second, and third layers, further elongating the exterior and/or interior walls of the optofluidic device.

At block 1012, the light source may emit a light in the third pattern, similar to the pattern in block 1008, such that a fifth layer of resin may be deposited on the fourth layer of resin. While in this example the light source may repeat the third pattern, it is not limited to. The user and/or other device may alter the third pattern such that, for example, various amounts of developed resin are deposited on the fourth layer of resin.

At block 1014, the light source may emit light in the second pattern, similar to the pattern in block 1006, such that a sixth layer of resin may be deposited on the fifth layer of resin. Further, to provide support to internal structures, the user may program the light source to create temporary support structures between layers and/or between portions of layers, which may be removed later in manufacturing. Structures may, for example, allow complex structures to be manufactured, while preventing the optofluidic device, or portions of the optofluidic device, to collapse during manufacturing.

At block 1016, the light source may emit light in the first pattern, similar to the pattern in block 1004, such that a seventh layer of resin is deposited on the sixth layer of resin. By doing so, the optofluidic device may be fully formed, wherein an inner resin cladding may be deposited within an outer resin cladding. To remove the undeveloped resin, the optofluidic device may be patterned to connect to a microfluidic connector to eject at least a portion of the undeveloped resin.

Figures 11A, 11B, 11C:
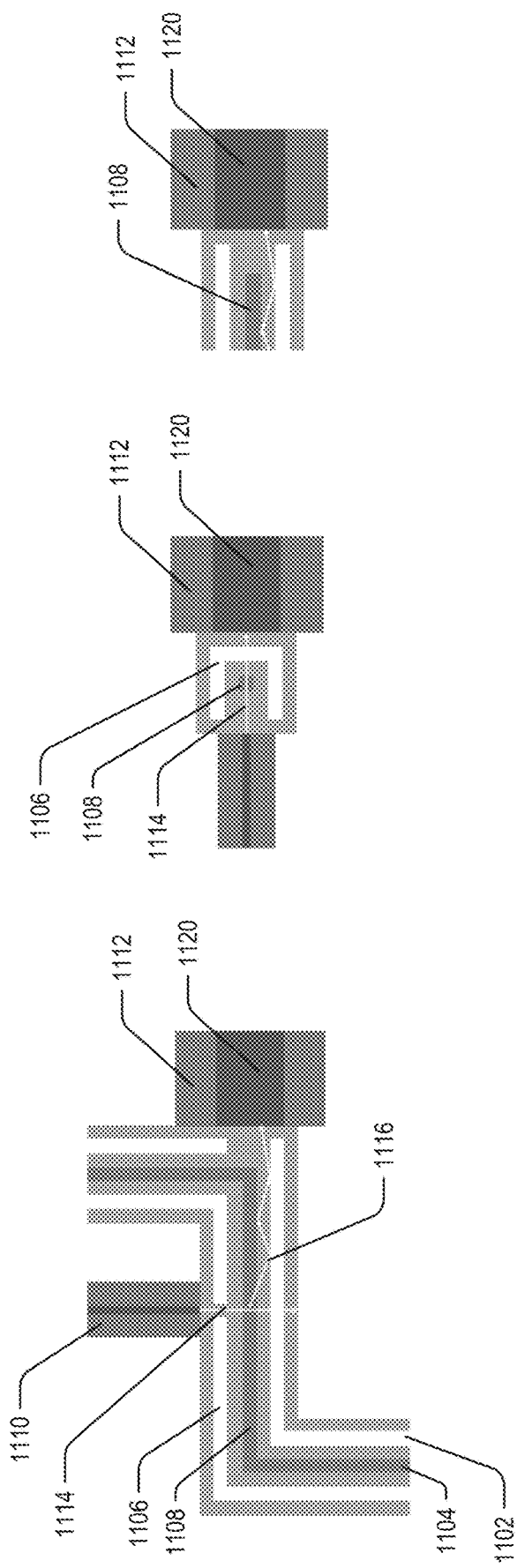
FIG. 11A illustrates a top-down schematic view of an optofluidic device.
FIG. 11B illustrates a cross-sectional view depicting a multi-mode fiber (MMF) and fluid channel intersection.
FIG. 11C illustrates another cross-sectional view depicting a MMF and fluid channel intersection.

FIG. 11A-C illustrate the ability for an optofluidic device to integrate an optofluidic device and at least one optical component. FIG. 11A illustrates a top-down schematic view of an optofluidic device. In examples, the optofluidic device may include an air inlet 1102 and a fluid inlet 1104. The air inlet 1102 may allow for air to be injected into the rectangular air gap 1106 located in the optofluidic device. The fluid inlet 1104 may allow fluid and/or gas to be injected into the hollow and rectangular fluid channel 1108. In some examples, the fluid may contain one or more fluorescent particles which may be detected in the optofluidic device. For example, the optofluidic device shown in FIG. 11A may be coupled to single-mode fibers (SMFs) 1110 and multi-mode fibers (MMFs) 1112. In some examples, an excitation light 1114 may be emitted from the SMFs 1110. The excitation light 1114 may project through the optofluidic device, including the fluid located within the device. In some examples, the excitation light 1114 may come into contact with one or more fluorescent particles, exciting one or more particles. The excited particles 1116 may travel through the optofluidic device to an output 1118. In some examples, once the excited particles 1116 reach the output 1118, the excited particles may be captured by a detector 1120 which may be located in the MMFs 1112. The detector 1120 may detect and identify the excited particles 1116.

FIG. 11B illustrates a y-x cross-sectional view depicting a MMF 1112 and fluid channel 1108 intersection. The excitation light 1114 may be guided across the fluid channel 1108 In some examples, the excitation light 1114 may come into contact with one or more fluorescent particles, exciting one or more particles. In some examples, due to laminar flow, undeveloped resin flow may be hidden behind optical coupling points. To reduce the effect of the hidden resin, air may be pushed through the air channel 1106, ejecting at least some of the undeveloped resin. The remaining undeveloped resin may be tuned by adjusting the dimension of the optical coupling, allowing at least some selection of how much undeveloped resin remains in the air channel 1106 for post-process smoothing.

FIG. 11C is a y-z cross sectional view depicting a MMF 1112 and fluid channel 1108 intersection. In some examples, excited particles may travel through the optofluidic device toward a detector 1120. In some examples, the detector 1120 may be capable of single particle detection.

In examples, fluorescently-labeled latex beads may be introduced into the fluid inlet. The latex beads may include fluorescent dye. When the fluorescently-labeled latex beads cross the SMF intersection, the fluorescent dye may be excited, and the emission may be captured with the optofluidic device. In some examples, the optofluidic device may guide the light to the MMF and then to a detector. In some examples, latex particles may stick to the walls of the fluid channel, eventually clogging the entire channel. To remove the latex particles, a detergent may be introduced to the fluid. In other examples, the channel may be coated with a thin layer of a non-reactive surface (such as PEG) to remove the latex particles. To increase particle detection, various resins with a low autofluorescence may be used. In some examples, resin with a low autofluorescence may reduce the excitation of the latex particles such that the particle fluorescence occurs at a different timescale compared to autofluorescence. Alternatively, a spatially modulated excitation pattern may be used. For example, particles may fluoresce with a specific temporal pattern while the autofluorescence remains constant.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method of manufacturing an optofluidic device, comprising:
   lowering a build platform into a vat of undeveloped resin;
   causing a light source to emit a light in a first pattern on the undeveloped resin such that a first layer of resin is deposited on the build platform, the first layer of resin being developed resin;
   causing the light source to emit light in a second pattern such that a second layer of resin is deposited on the first layer of resin, a first portion and a second portion of the second layer of resin being developed and a third portion of the second layer of resin remaining undeveloped, the third portion of the second layer of resin deposited between the first portion and second portion;
   causing the light source to emit light in a third pattern such that a third layer of resin is deposited on the second layer of resin, the third layer of resin including a first portion, a second portion, and a third portion that is developed resin, the third layer of resin including a fourth portion and a fifth portion remaining undeveloped, the fourth portion of the third layer of resin deposited between the first portion and second portion of the third layer of resin, and the fifth portion of the third layer of resin deposited between the second portion and third portion of the third layer of resin;
   causing the light source to emit light in a fourth pattern such that a fourth layer of resin is deposited on the third layer of resin, the fourth layer of resin including a first portion, a second portion, a third portion, and a fourth portion that is developed resin, the fourth layer including a fifth portion, a sixth portion, and a seventh portion remaining undeveloped, the fifth portion of the fourth layer of resin deposited between the first portion and second portion of the fourth layer of resin, the sixth portion of the fourth layer of resin deposited between the second portion and third portion of the fourth layer of resin, and the seventh portion of the fourth layer of resin deposited between the third portion and fourth portion of the fourth layer of resin;
   causing the light source to emit light in the third pattern such that a fifth layer of resin is deposited on the fourth layer of resin;
   causing the light source to emit light in the second pattern such that a sixth layer of resin is deposited on the fifth layer of resin; and
   causing the light source to emit light in the first pattern such that a seventh layer of resin is deposited on the sixth layer of resin.

2. The method of claim 1, further comprising:
   causing a stream of gas to contact the optofluidic device such that at least a portion of undeveloped resin is removed from the optofluidic; and
   exposing the optofluidic device to a lamp configured to emit light in at least one wavelength band to polymerize remaining undeveloped resin.

3. The method of claim 1, wherein causing the light source to emit light includes causing the light source to emit light at a wavelength range of about 350 nm to 380 nm.

4. The method of claim 1, wherein causing the light source to emit light includes causing the light source to emit light such that when the first layer, second layer, third, layer, fourth layer, fifth layer, sixth layer, and seventh layer of the resin are deposited the optofluidic device has at least one dimension that is less than 100 µm.

5. The method of claim 1, further comprising selecting undeveloped resin from multiple undeveloped resin types such that when the light source emits light the developed resin has an absorbance configured to absorb a predetermined amount of the light.

6. The method of claim 1, further comprising selecting undeveloped resin such that when the light source emits light the developed resin has a surface roughness of less than 50 nm RMS.

7. The method of claim 1, further comprising selecting undeveloped resin such that when the light source emits light the developed resin waveguide has an optical mode loss of $\alpha < 0.1$ dB/cm at a designed wavelength.

8. An optofluidic device, comprising:
   a first resin cladding; and
   a second resin cladding deposited within the first resin cladding and being separated at least in part from the first resin cladding such that a first substantially rectangular gap is present between the first resin cladding and the second resin cladding, the second resin cladding being substantially rectangular, the second resin cladding having a partially hollow and substantially rectangular interior portion.

9. The device of claim 8, wherein the first resin cladding and the second resin cladding are configured to contain light when directed at the first substantially rectangular gap.

10. The device of claim 8, wherein the first substantially rectangular gap contains a solvent.

11. The device of claim 10, wherein the solvent includes fluorescently-labeled particles.

12. The device of claim 8, wherein the first resin cladding has at least one dimension less than 100 µm.

13. The device of claim 8, wherein the first resin cladding and second resin cladding have a desired absorbance about 0.046 or less, when a light source is directed at the first substantially rectangular gap.

14. A device comprising:
   a first resin cladding; and
   a second resin cladding deposited within the first resin cladding and being separated at least in part from the first resin cladding such that a first substantially rectangular gap is present between the first resin cladding and the second resin cladding, the second resin cladding being substantially rectangular, the second resin cladding having a partially hollow and substantially rectangular interior portion.

15. The device of claim 14, wherein the first resin cladding and second resin cladding have a desired absorbance about 0.047 or less, when a light source is directed at the first substantially rectangular gap.

16. The device of claim 14, wherein the first resin cladding and second resin cladding have a refractive index of about 1.5 or less.

17. The device of claim 14, wherein the first resin cladding and second resin cladding have a refractive index of about 1.5 or more.

18. The device of claim 14, wherein the first resin cladding has at least one dimension less than 100 µm.

19. The device of claim 14, wherein the first resin cladding and second resin cladding have an optical mode loss of $\alpha < 0.1$ dB/cm when a light source is directed at the first substantially rectangular gap.

20. The device of claim 14, wherein the first resin cladding and second resin cladding have a surface roughness of less than 50 nm RMS.

* * * * *